United States Patent [19]

Higuchi

[11] Patent Number: 4,844,505
[45] Date of Patent: Jul. 4, 1989

[54] SUSPENSION OF VEHICLE

[75] Inventor: Akira Higuchi, Susono, Japan

[73] Assignee: Toyota Jidosha Kabushiki Kaisha, Aichi, Japan

[21] Appl. No.: 132,189

[22] Filed: Dec. 14, 1987

[30] Foreign Application Priority Data

Oct. 23, 1987 [JP] Japan .............................. 62-162143[U]

[51] Int. Cl.4 ................................................ B60G 3/20
[52] U.S. Cl. ..................................... 280/663; 280/666
[58] Field of Search ............... 280/661, 666, 668, 690, 280/691, 696, 701, 663

[56] References Cited

U.S. PATENT DOCUMENTS

| | | | |
|---|---|---|---|
| 3,068,022 | 12/1962 | Fiala | 280/668 |
| 3,163,441 | 12/1964 | Traugott | 280/661 |
| 4,313,617 | 2/1982 | Muramatsu et al. | 280/661 |
| 4,377,298 | 3/1983 | Finn et al. | 280/696 |

FOREIGN PATENT DOCUMENTS

| | | | |
|---|---|---|---|
| 1580494 | 3/1970 | Fed. Rep. of Germany | 280/701 |
| 82613 | 7/1981 | Japan . | |
| 128207 | 10/1981 | Japan . | |
| 209408 | 12/1982 | Japan . | |
| 47613 | 3/1983 | Japan . | |

Primary Examiner—Charles A. Marmor
Assistant Examiner—Ross Weaver
Attorney, Agent, or Firm—Oliff & Berridge

[57] ABSTRACT

A suspension for vehicles has a lower arm pivotally connected at its one end to the chassis of the vehicle and pivotally connected at its other end to one end of a carrier and also to one end of a strut. The other end of the carrier is pivotally connected to the strut, and the lower arm and the strut are connected to each other through an intermediate connecting mechanism such that said lower arm and said strut are movable relative to each other.

14 Claims, 14 Drawing Sheets

SUSPENSION OF VEHICLE

BACKGROUND OF THE INVENTION

1. Field of the Invention

The present invention relates to a suspension for vehicles.

2. Description of the Related Art

There are two types of independent suspension systems generally used in vehicles: namely, a system known as strut-type suspension and a system known as double-wishbone-type suspension.

Figure 20:
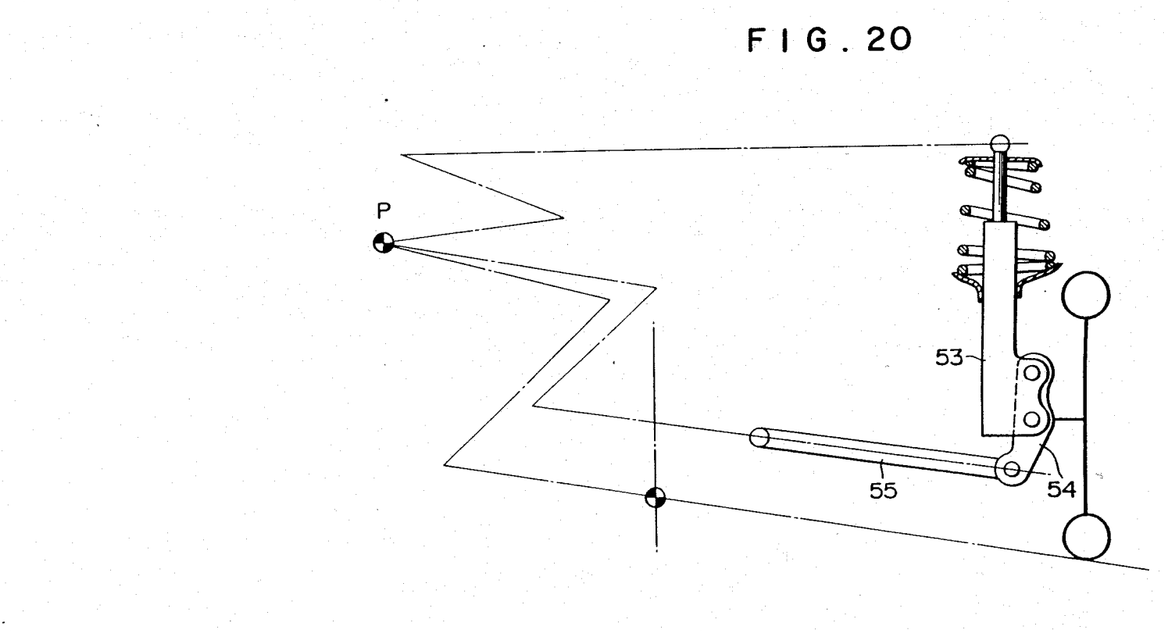
FIG. 20 is a front elevational view of a known strut-type vehicle suspension which is devoid of the connection between the lower arm and the strut.

As shown in FIG. 20, the strut-type suspension has a strut 53 which is connected at its upper end to the chassis of a vehicle, a carrier 54 connected to the strut 53, and a control arm 55 connected between the carrier 54 and the chassis. This type of suspension is advantageous in that it can easily be mounted on vehicles because it requires a comparatively small installation space. On the other hand, this type of suspension is disadvantageous in that it allows only a small change in camber and has only a small degree of freedom in the geometric setting such as roll center.

The double-wishbone-type suspension, which also finds extensive use, has an upper control arm and a lower control arm which are provided between the carrier and the chassis. This type of suspension offers a large degree of freedom in the geometric setting but requires a comparatively large installation space. In addition, this type of suspension is difficult to mount on vehicles.

Figure 21:
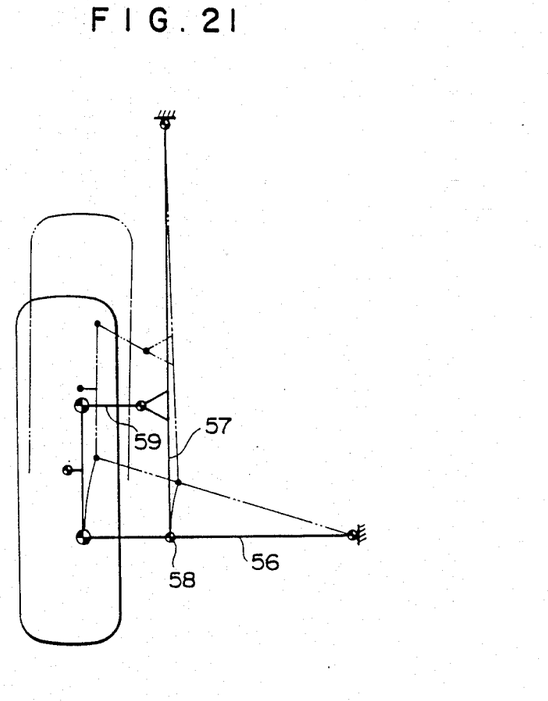
FIG. 21 is a front elevational view of an essential portion of another known strut-type vehicle suspension in which the lower arm and the strut are directly connected to each other.

Under these circumstances, Japanese Patent Laid-Open No. 56-82613 discloses a vehicle suspension which has advantages offered by both types of suspension mentioned above, namely, a reduced installation space, easy mounting on vehicles and a large degree of freedom of geometric setting. In this improved suspension, as shown in FIG. 21, the point 58 of pivotal connection between the lower arm 56 and the strut 57 is located near the center of the lower arm. In this arrangement, therefore, a large camber angle is obtainable by reducing the length of the upper arm 59. However, there is a practical limit in the reduction of the length of the upper arm because the reduced upper arm length increases the tendency of buckling. Consequently, the degree of freedom for assuring a large change in the camber angle is limited.

SUMMARY OF THE INVENTION

In order to obviate the above-described problems of the prior art, the present invention aims at providing a suspension for a vehicle comprising: a lower arm which is pivotally connected at its one end to the chassis of the vehicle; a carrier carrying a wheel and having one end pivotally connected to the other end of the lower arm; and a strut to which the other end of the carrier is pivotally connected; the lower arm and the strut being connected through an intermediate connecting mechanism in such a manner as to allow a relative movement between the lower arm and the strut.

In the suspension of the present invention, the lower arm and the strut are connected through an intermediate member such as a link in such a manner that they are movable relative to each other. Consequently, a large stroke of the strut which allows a large stroke of the wheel during bounding, as well as a large change in the camber angle, is ensured by virtue of the relative movement between the lower arm and the strut. In addition, the installation space of the suspension is reduced to facilitate mounting, and a large degree of freedom in geometrical setting is achieved. Furthermore, since the upper end of the carrier does not move vertically relative to the strut, it is possible to maximize the vertical stroke of the strut. Furthermore, since the described behavior of the lower arm and the strut is obtained without moving the carrier and the strut towards and away from each other, the suspension is less liable to be affected by external force which may be applied to the wheel in lateral or longitudinal directions of the vehicle chassis.

It is known that a vehicle suspension preferably has means for allowing the camber angle to be adjusted. To comply with this demand, the present invention is aimed at providing, as another object, a suspension which provides a large degree of freedom in the setting of the camber angle by a single mechanism having a simplified construction.

This object can be achieved by arranging such that the point of connection between the intermediate member such as a link and at least one of the strut and the lower arm is laterally movable so as to change the range over which the camber angle is changeable. This in turn facilitates the adjustment for attaining wheel alignment when mounting the suspension on the vehicle. Namely, if the point of connection between the intermediate member, e.g., a link, and the strut and the point of connection between the intermediate member and the lower arm are moved laterally in the same direction, the camber angle of the wheel is changed, whereas, if these points of connection are moved laterally in opposite directions, the caster angle of the wheel is changed. It is thus possible to easily adjust the wheel alignment of the vehicle by means of a simple inexpensive and easily obtainable arrangement which enables both points of connection to be laterally shifted.

DESCRIPTION OF THE PREFERRED EMBODIMENTS

Preferred embodiments of the present invention will be described hereinunder with reference to the drawings.

Figure 1:
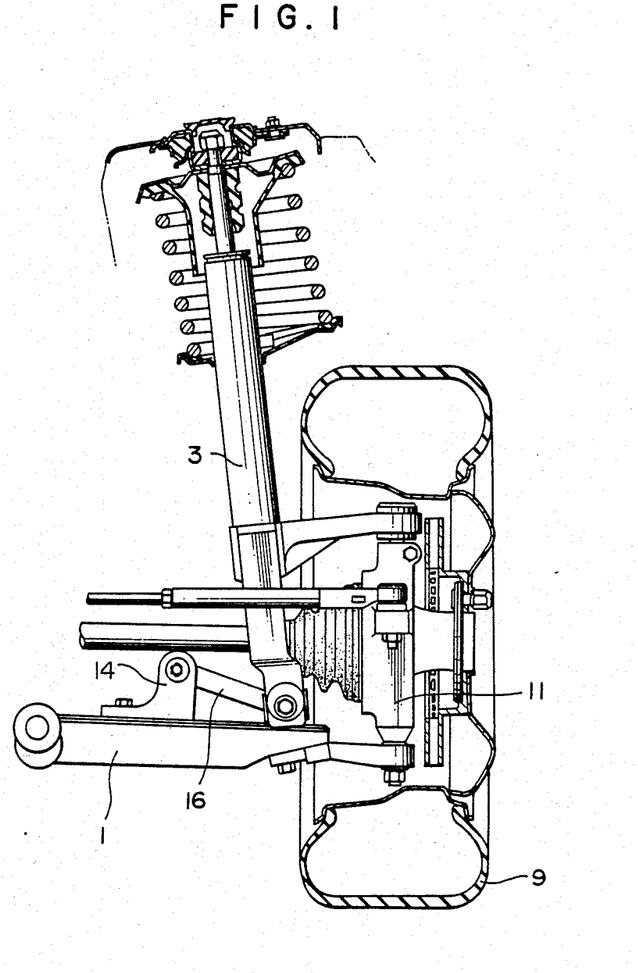
FIG. 1 is a front elevational view of an essential portion of a strut-type vehicle suspension as an embodiment of the present invention.
Figure 2:
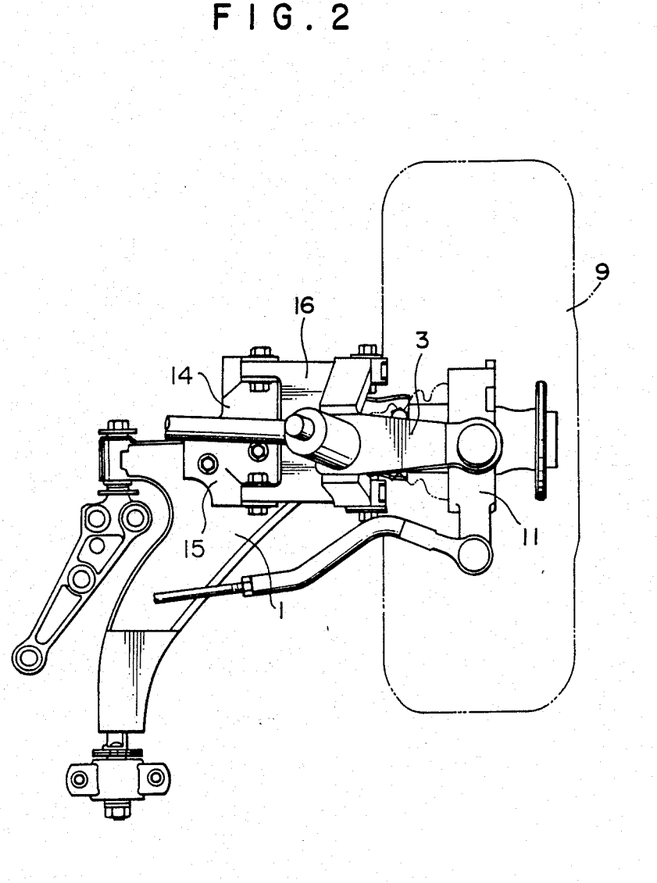
FIG. 2 is a plan view of the suspension as shown in FIG. 1.
Figure 3:
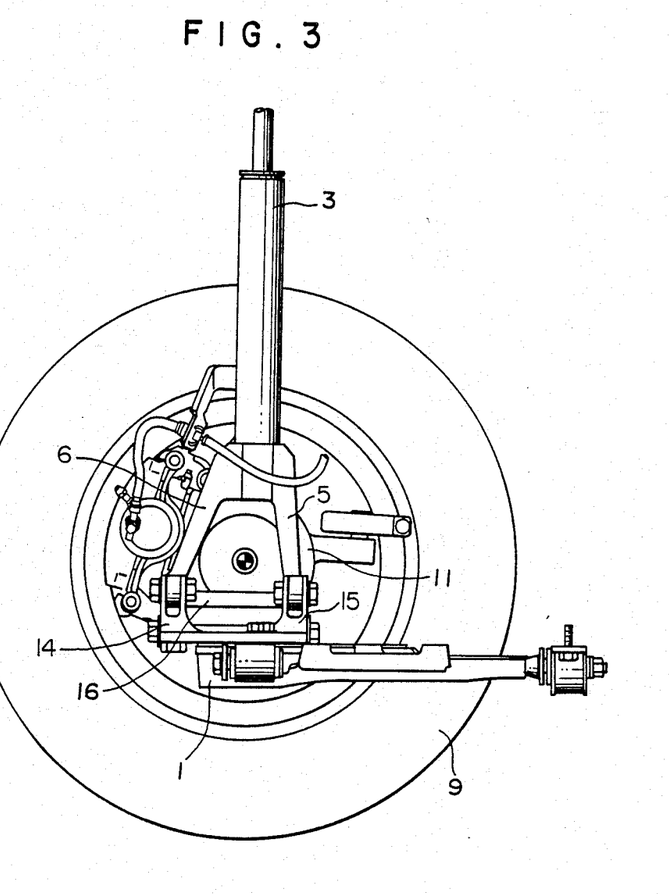
FIG. 3 is a side elevational view of the suspension as shown in FIG. 1.
Figure 4:
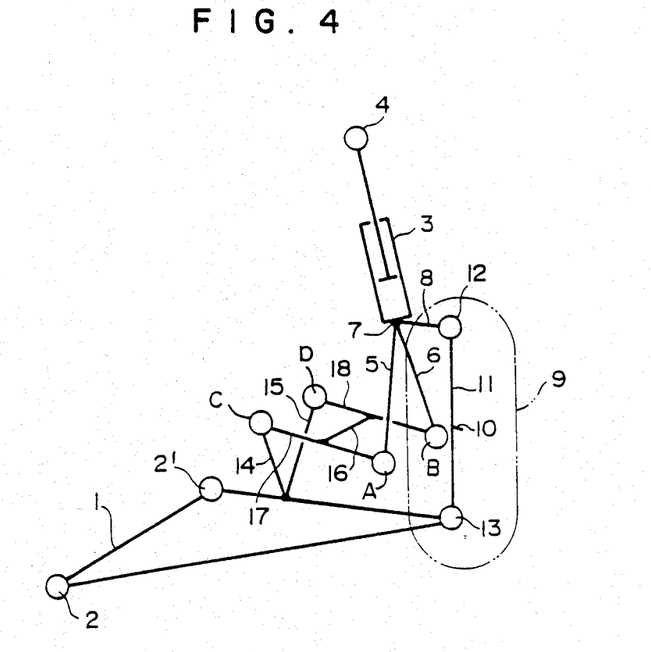
FIG. 4 is a diagrammatic illustration of the suspension shown in FIG. 1.

FIGS. 1 to 3 in combination illustrate a strut-type vehicle suspension as an embodiment of the present invention, while FIG. 4 is a diagrammatic illustration of the suspension shown in FIGS. 1 to 3. The suspension has a lower arm 1 with two legs which are connected at their ends 2 and 2' to the chassis of a vehicle. The strut 3 is connected at its upper end 4 to the chassis while the lower end of same is bifurcated to have leg portions 5 and 6 which extend so as to diverge downward. The point 7 from which the upper ends of the legs 5 and 6 are formed has an arm portion 8 which projects laterally therefrom. the arm portion 8 is connected to an upper connecting portion 12 of a carrier 11 which supports the axle 10 of the wheel 9, while the other end of the lower arm 1 is connected to a lower connecting portion 13 of the carrier 11. The lower arm 1 is bifurcated at its intermediate portion such as to have legs 14 and 15 which diverge upward. The legs 5, 6 of the strut 3 and the legs 14, 15 of the lower arm 1 are connected through an H-shaped link 16 in a manner which will be explained hereinunder.

The link 16 has a pair of link portions 17 and 18 which extend substantially parallel to each other. The legs 5 and 6 of the strut 3 are connected at their one ends to one ends of the respective link portions 17 and 18 of the link 16 as at A and B, while the other ends of the link portions 17 and 18 are connected to the legs 14 and 15 of the lower arm 1 as at C and D, respectively.

A suspension alignment adjusting mechanism having a construction which will be explained hereinunder is provided in each of the connecting points, A,B between the strut 3 and the link 16 or in each of the connecting points C and D between the link 16 and the lower arm 1 or in each of all the connecting points A, B, C and D.

Figure 10:
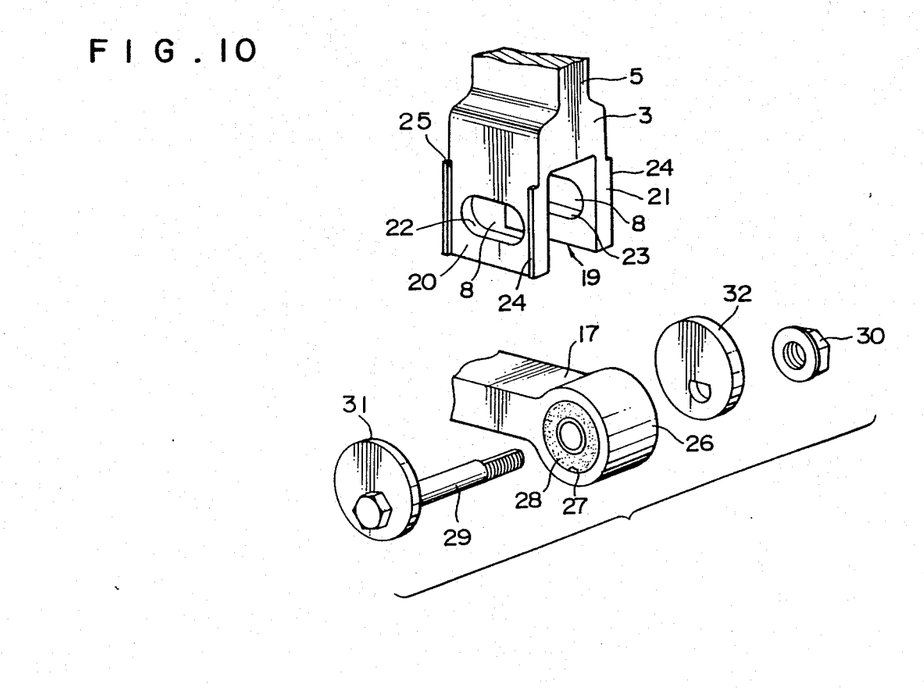
FIG. 10 is an exploded perspective view of a connecting portion.

FIG. 10 is an exploded view of an essential part of a suspension in which the alignment adjusting mechanism is provided in each of the connecting points A and B shown in FIG. 4. Since the same construction is adopted in both of the connecting points A and B, the connecting construction at the connecting point A will be described by way of example, with specific reference to FIG. 10. The leg 5 of the strut 3 is provided at its lower end with a recess 19 which opens laterally and downwardly. Parallel elongated holes 22, 23 are formed in both opposing walls 20 and 21 which define the recess 19. A pair of linear cam guiding projections 24, 25 are formed on the edges of the outer surface of the side wall 20 adjacent to the respective ends of the elongated hole 22, so as to extend vertically parallel to each other. Similarly, vertical parallel linear guiding projections 24, 25 are formed on the edges of the outer surface of the side wall 21 adjacent to the ends of the longitudinal hole 23. In FIG. 10, only one of the guiding projections 25 is shown.

The end 26 of the link portion 17 of the H-shaped link 16 has a cylindrical form and is provided with a bore 27 which extends in the longitudinal direction of the vehicle chassis. The bore 27 receives a bush 28. The end 26 of the link portion 17 is received laterally in the recess 19 formed in the leg 5 of the strut 3. A bolt 29 is inserted such as to extend through the elongated hole 22 formed in the side wall 20 of the leg 5, the bore formed in the bush 28 fitted in the end 26 of the link portion 17 of the link 16, and the elongated hole 23 formed in the side wall 21 of the leg 5, and a nut 30 is screwed onto the threaded end of the bolt 29, whereby the end 26 of the link portion 17 of the link 16 is pivotally held in the recess 19 of the leg 5 of the strut 3. The bolt 29 carries a pair of eccentric cams 31 and 32 which are positioned on the outer surfaces of the side walls 20 and 21 defining the recess 19 in the leg 5, so as to engage with the linear cam guiding projections 24 and 25. The eccentric cams 31 and 32 are set at the same angular phase about the axis of the bolt 29. A pivotal connection is thus achieved at the point A between the leg 5 of the strut 3 and the link portion 17 of the H-shaped link 16. The same pivotal connecting construction is provided at the point B of connection between the leg 6 of the strut 3 and the other link portion 18 of the link 16.

In this arrangement, when the eccentric cams are rotated in the same directions at the points A and B of connection, the legs 5 and 6 of the strut 3 are displaced laterally with respect to the link portions 17 and 18, thereby causing a change in the camber angle. Conversely, if the eccentric cams on the point A of connection and the eccentric cams on the point B of connection are rotated in counter directions, the strut 3 is made to rotate about an axis which is substantially vertical, so that the point of connection between the strut 3 and the upper connecting portion of the knuckle 11 is moved back and forth in relation to the direction of running of the vehicle, thereby causing a change in the caster angle. The wheel alignment of the suspension, therefore, can very easily be adjusted simply by rotating the eccentric cams.

It is possible to provide the above-described alignment adjusting mechanism on the points C and D of connection, by constructing and arranging the legs 14 and 15 of the lower arm 1 in the same manner as the legs 5 and 6 of the strut 3.

Figure 5:
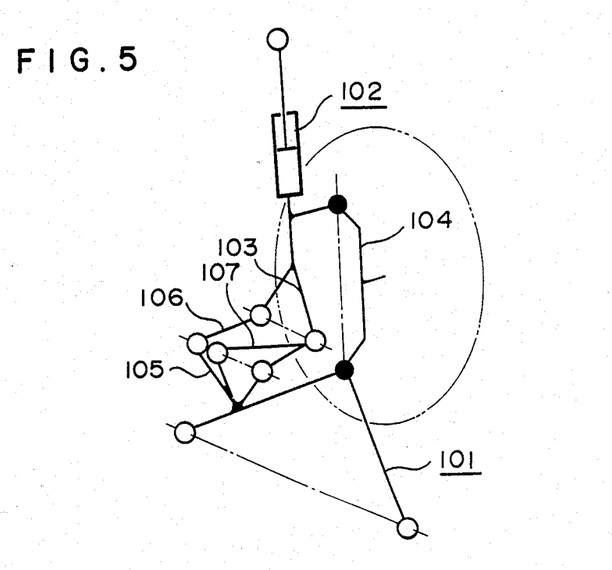
FIGS. 5 to 9 are diagrammatic illustrations of different embodiments, corresponding to the illustration in FIG. 4.

FIG. 5 shows another embodiment of a strut-type suspension suitable for use in combination with steerable wheels of a vehicle. In this Figure, the suspension is illustrated in a diagrammatic form as in the case of FIG. 4.

This suspension has a lower arm 101 which is bifurcated to have two legs which are rockably connected to the chassis, and a strut 102 which is swingably secured at its upper end to the vehicle chassis and bifurcated at its lower end such as to have two leg portions 103. The suspension further has a carrier 104 which is pivotally connected at its upper end to an intermediate portion of the strut 102 and also at its lower end to the point of the lower arm 101 from which the two legs are formed. The lower arm 101 also has a trifurcated extension 105 comprising three legs to which are connected the leg portions 103 of the strut 102 through an auxiliary member 106 and a bifurcated auxiliary member 107. The lower arm 101, therefore, can receive longitudina, lateral and rotational input movements of the strut 102 without any mechanical restriction.

Figure 6:
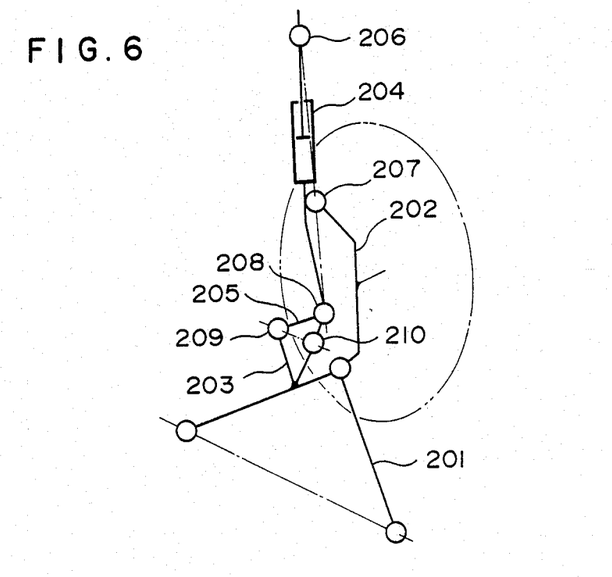

FIG. 6 diagrammatically shows another embodiment of a strut type vehicle suspension suitable for use in combination with a steerable wheel of a vehicle. This suspension has a lower arm 201 which is bifurcated to have two legs which are pivotally connected to the chassis through ball joints or bushes. The point of the lower arm 201 from which the two legs are formed also is pivotally connected to the lower end of a carrier 202. The lower arm 201 also has an upwardly extending bifurcated extension 203 which diverges upward. The suspension further has a strut 204 which has an upper end for pivotal connection to the vehicle chassis and a lower end for pivotal connection to an auxiliary bifurcated member 205. The strut 204 also is provided at an intermediate portion thereof with a portion for pivotal connection to the upper end of the carrier 102. These three connecting portions, denoted by 206, 207 and 208, are arranged on a straight line.

The two leg portions of the bifurcated auxiliary member 205 are pivotally connected to the two legs of the bifurcated extension 203 of the lower arm 201. the point of the lower arm 201 from which the two legs are formed is pivotally connected to the lower connecting portion of the carrier 202. According to this arrangment, since the three connecting portions 206, 207 and 208 are arranged on a straight line, it is possible to obtain a suspension having a reduced number of connections and, hence, reduced mechanical restriction, so that any force from the strut 204, acting in the longitudinal or lateral direction of the vehicle chassis, can be borne by the lower arm 201. The connections 208, 209 and 210 of the auxiliary member 205 are provided with suspension alignment adjusting mechanisms.

Figure 7:
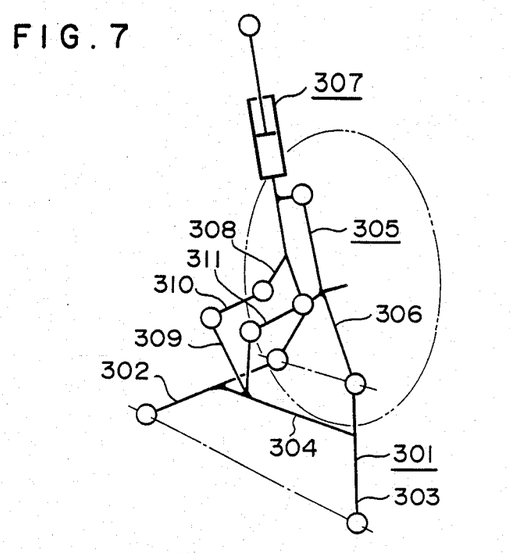

FIG. 7 is a diagrammatic illustration of a strut-type vehicle suspension as a further embodiment of the invention, suitable for use in combination with a non-steerable wheel of a vehicle.

This suspension has a lower arm 301 which has an H-shaped construction composed of a pair of opposing arms 302, 303 and an intermediate arm 304 through which the opposing arms 302, 303 are integrally connected to each other. The suspension also has a carrier 305 with a bifurcated lower portion 306. The suspension also has a strut 307 which is pivotally connected at its upper end to the vehicle chassis and which is provided with a bifurcated end 308. The strut 307 is pivotally connected at its intermediate portion to the upper end of the carrier 305. A bifurcated upright extension 309 is formed on the intermediate arm 304 of the lower arm 301. The two legs of the bifurcated portion 309 are pivotally connected through a pair of auxiliary members 310, 311 to the two leg portions of the bifurcated end 308 of the strut 307. The opposing arms 302, 303 of the lower arm 301 are pivotally connected at their one ends to the vehicle chassis and at their other ends to the two leg portions of the bifurcated portion 306 of the carrier 305. According to this arrangement, the lower arm 301 can retrieve lateral and rotational force from the strut 307.

Figure 8:
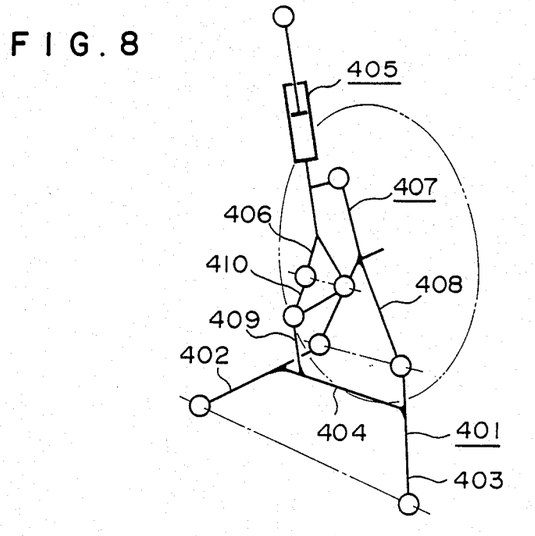

FIG. 8 diagrammatically shows a strut-type vehicle suspension suitable for use in combination with a non-steerable wheel of vehicle, as a further embodiment of the present invention.

This suspension has a lower arm 401 having an H-shaped structure composed of a pair of opposing arms 402, 403 and an intermediate arm 404 through which the opposing arms are integrally connected to each other. The suspension also has a strut 405 which is pivotally connected at its upper end to the vehicle chassis and provided with a bifurcated lower end 406. The suspension further has a carrier 407 having an upper end pivotally connected to an intermediate portion of the strut 405 and a bifurcated lower end 408, the two legs of which are pivotally connected to one ends of the opposing arms 402, 403 of the lower arm 401. The intermediate arm 404 of the lower arm 401 is provided with an upright extension 409 which is pivotally connected to the two leg portions of the bifurcated portion 406 of the strut 405 through a bifurcated auxiliary member 410. With this arrangement, the lower arm 401 can receive the lateral and rotational force from the strut 405, with a reduced number of connections of the auxiliary member 410 and without any mechanical restriction.

Figure 9:
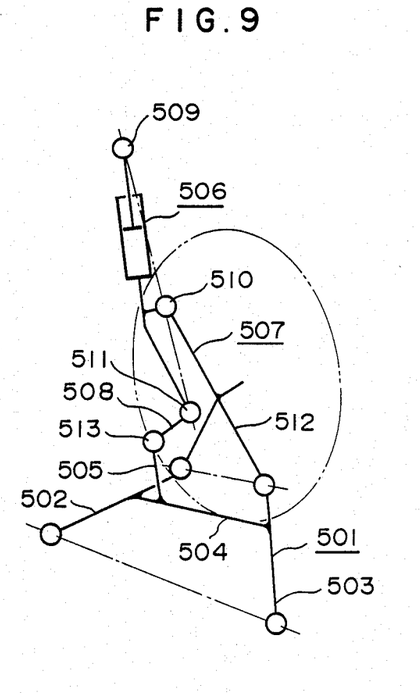

FIG. 9 shows a strut-type vehicle suspension as a further embodiment of the invention, suitable for use in combination with a non-steerable wheel of the vehicle. The suspension has a lower arm 501 which has an H-shaped structure composed of a pair of opposing arms 502, 503 and an intermediate arm 504 through which the opposing arms 502, 503 are integrally connected to each other. The intermediate arm 504 is provided with an upright extension 505. The suspension further has a strut 506 which is pivotally connected at its upper end 509 to the vehicle chassis and at its lower end 511 to the upper end of the upright extension 505 of the intermediate arm 504 through an auxiliary member 508. The suspension further has a carrier 507 which is pivotally connected at its upper end 510 to an intermediate portion of the strut 506. These three points of connection, denoted by 509, 510 and 511, are arranged on a straight line. The carrier 507 has a bifurcated lower end 512, the two legs of which are pivotally connected to one ends of the opposing arms 502, 503 of the lower arm 501. The other ends of the opposing arms 502, 503 are pivotally connected to the vehicle chassis. Since the points of connection 509, 510 and 511 are arranged on a straight line, it is possible to obtain a suspension having a reduced number of connections when enabling the lower arm 501 to receive a lateral force from the strut 506. Furthermore, an alignment adjusting mechanism which may be the same as that explained in connection with the first embodiment, may be provided in one or both of the connection between the auxiliary member 508 and the strut 506 and the connection between the auxiliary member 508 and the upright extension 505 of the lower arm 501.

FIGS. 11 to 19 show different embodiments having various modifications of the link 16 used in the first embodiment.

Figure 11:
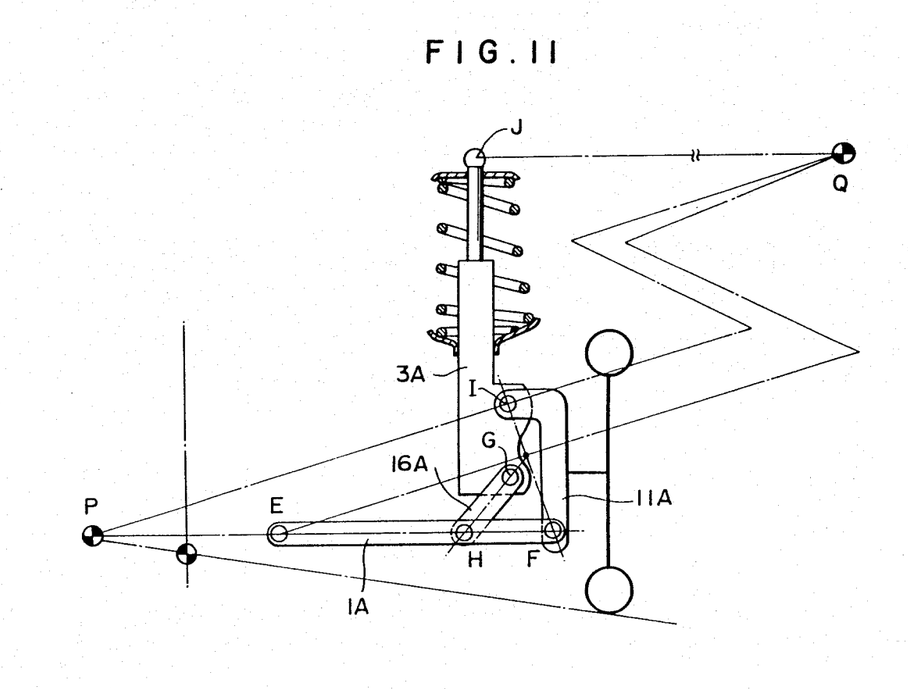
FIG. 11 is a front elevational view of an essential portion of a strut-type vehicle suspension in accordance with a different embodiment which does not make use of bifurcated portions of the lower arm and the strut.

In FIG. 11, a lower arm 1A is connected to the vehicle chassis at a point E. A strut 3A is connected to the vehicle chassis at a point J which is on the upper end thereof. The lower end of the strut 3A is connected to a point H on the lower arm 1A through a link 16A connected to the strut at a point G. A carrier 11A is connected at its upper point I to the strut 3A and at its lower point F to the lower arm 1A. The ocnnections at the points F, G, H and I are pivotable connections so that these points of connection form a link mechanism.

When this suspension strokes, the instantaneous center of the strut 3A is determined, as denoted by Q, by the point J on the strut 3A, the point of intersection between the line G-H and the line F-I and by the point E on the lower arm 1A. The movement of the carrier 11A is restricted by the line E-F on the lower arm 1A and by the point I on the strut 3A and is rotatable about an instantaneous center P.

Figure 12:
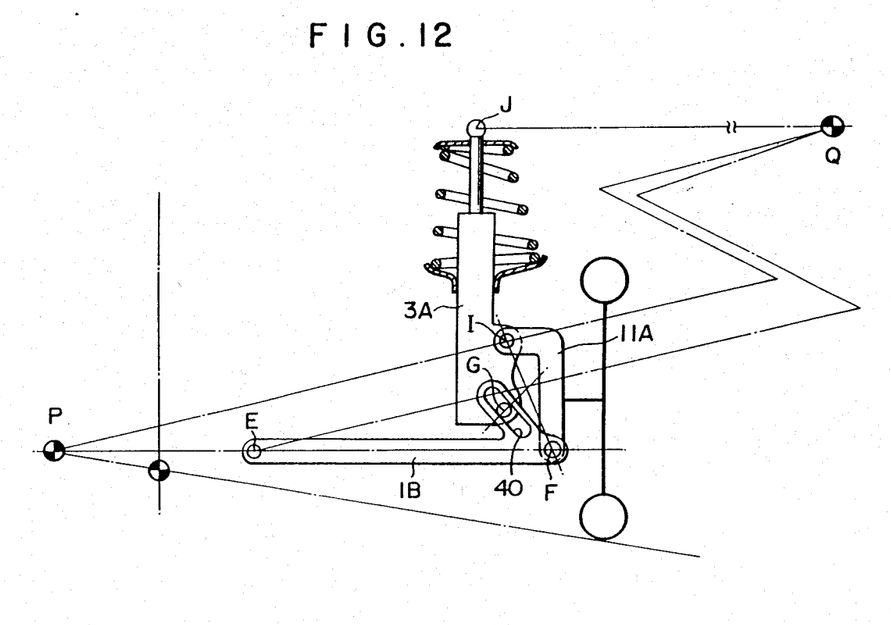
FIG. 12 is a front elevational view of an essential portion of a strut-type vehicle suspension in accordance with a different embodiment, corresponding to the view shown in FIG. 11.

FIG. 12 shows a suspension as a further embodiment in which an elongated hole 40 in a lower arm 1B is used in place of the link 16A and lower arm 1A shown in FIG. 11.

Figure 13:
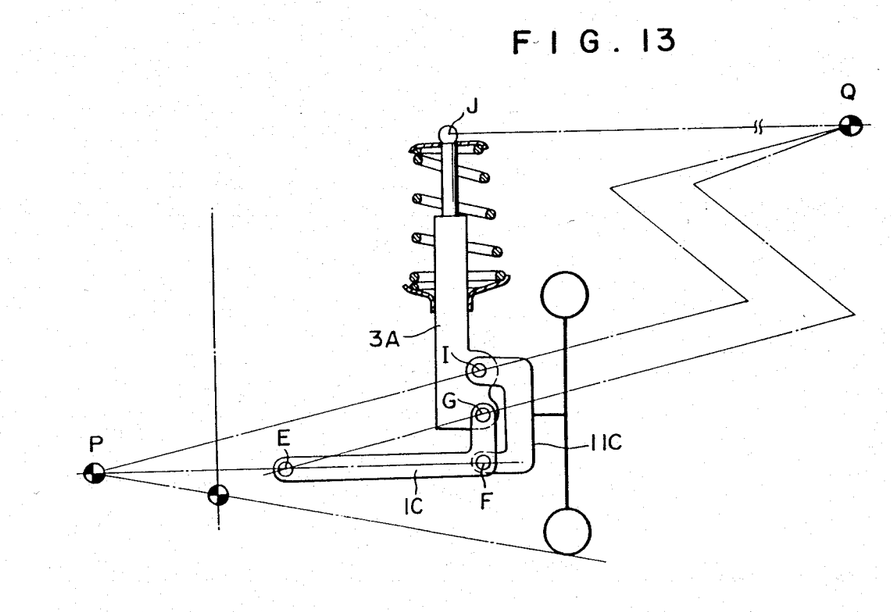
FIG. 13 is a front elevational view of an essential portion of a strut-type vehicle suspension in accordance with a further embodiment, corresponding to the view shown in FIG. 11.
Figure 14:
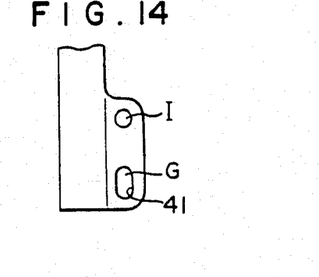
FIG. 14 is an enlarged view illustrating an elongated hole provided at a point G.

FIG. 13 shows a further embodiment which is similar to that shown in FIG. 11 but is devoid of the link 16A so as to afford modifications as shown in FIGS. 14 to 19. In this embodiment, the points J, I and G are provided substantially on the same axis, so as to reduce the tendency of generation of a moment about the line J-G due to reactional force transmitted from the wheel during braking. Namely, in this embodiment, the lower arm 1C and the carrier 11C are connected to each other at a point F, and an elongated hole 41 is formed at the point G on the strut 3A as shown in FIG. 14 so as to allow the lower arm 1C to move vertically relative to the strut 3A.

Figure 15:
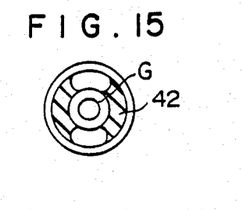
FIG. 15 is a fragmentary view illustrating an elastic member provided at the point G.
Figure 16:
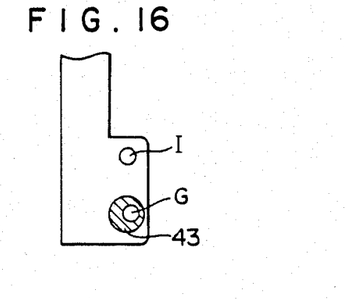
FIG. 16 is a fragmentary view illustrating an eccentric cam provided at the point G.
Figure 17:
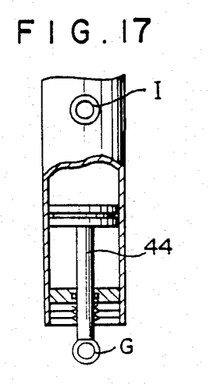
FIG. 17 is a sectional view of an essential portion illustrating a piston rod provided at the point G.
Figure 18:
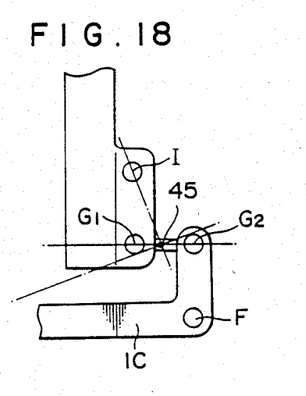
FIG. 18 is an enlarged view illustrating an arrangement in which the point G is constituted by two separate points $G_1$ and $G_2$.
Figure 19:
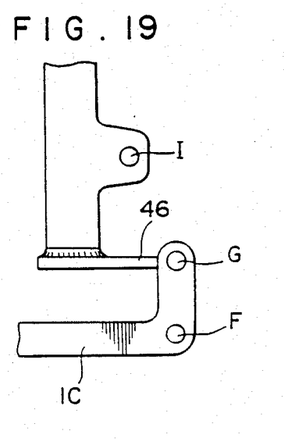
FIG. 19 is an illustration of a steel member which provides the point G.

FIG. 15 shows a modification in which an elastic member 42 is provided in the pivotal connection G. In modifications shown in FIGS. 16 and 17, an eccentric cam 43 and a piston-rod mechanism 44, respectively, are provided in the pivotal connection G. In a modification shown in FIG. 18, an H-shaped link 45 is used in the pivotal connection G so as to provide two pivoting points $G_1$ and $G_2$ corresponding to the single pivotal connection at the point G. Finally, FIG. 19 shows a modification in which a spring steel sheet 46 is incorporated in the pivotal connection G of the strut.

What is claimed is:

1. A suspension for a vehicle comprising: a lower arm which is pivotally connected at one end to a chassis of said vehicle; a carrier carrying a wheel and having one end pivotally connected to another end of said lower arm; a strut to which another end of said carrier is pivotally connected; and a movable intermediate connecting mechanism pivotally connected to each of said lower arm and said strut in such a manner as to connect and allow relative movement between said lower arm and said strut.

2. A suspension according to claim 1, wherein said intermediate connecting mechanism for connecting said lower arm and said strut includes a link.

3. A suspension according to claim 1, wherein said intermediate connecting mechanism for connecting said lower arm and said strut includes an elongated hole which enables said lower arm and said strut to slide relative to each other.

4. A suspension according to claim 1, wherein said intermediate connecting mechanism for connecting said lower arm and said strut includes an elastic member which enables said lower arm and said strut to slide relative to each other.

5. A suspension according to claim 1, wherein said intermediate connecting mechanism for connecting said lower arm and said strut includes a piston-rod mechanism which enables said lower arm and said strut to slide relative to each other.

6. A suspension according to claim 1, wherein said intermediate connecting mechanism for connecting said lower arm and said strut includes an eccentric cam which enables said lower arm and said strut to slide relative to each other.

7. A suspension according to claim 1, wherein said intermediate connecting mechanism for connecting said lower arm and said strut includes a spring steel sheet which enables said lower arm and said strut to slide relative to each other.

8. A suspension according to claim 1, wherein a lower end of said strut and said lower arm are connected to each other through a link, at least one of a connection between said link and said lower end of said strut and a connection between said link and said lower arm including adjusting means for adjusting said at least one connection in lateral directions.

9. A suspension according to claim 8, wherein said adjusting means includes an eccentric cam mechanism.

10. A strut-type suspension for a vehicle comprising: a lower arm having two legs pivotally connected to a chassis of said vehicle; a strut having an upper end pivotally connected to the chassis of said vehicle and having a lower end with two leg portions; and a carrier having an upper end pivotally connected to an intermediate portion of said strut and having a lower end pivotally connected to a first point on said lower arm from which said two legs are formed; wherein said lower arm is pivotally connected to said two leg portions of said strut through a first auxiliary member and a second bifurcated auxiliary member.

11. A strut-type suspension for a vehicle comprising: a strut having a first pivotal connecting portion on an upper portion thereof connected to a chassis of said vehicle, a second pivotal connecting portion on a lower portion thereof connected to an auxiliary member having two leg portions, and a third intermediate pivotal connecting portion connected to an upper end of a carrier, said first, second and third pivotal connecting portions being arranged on a substantially straight line; and a lower arm having two legs pivotally connected to said chassis, a first point on said lower arm from which said two legs are formed being pivotally connected to a lower pivotal connecting portion of said carrier, said lower arm being pivotally connected to the two leg portions of said auxiliary member.

12. A strut-type suspension for a vehicle comprising: a lower arm having an H-shaped structure comprised of a pair of opposing arms and an intermediate arm through which said opposing arms are integrally connected; a carrier having a lower portion with two legs; and a strut having an upper connecting portion pivotally connected to a chassis of said vehicle, a lower portion having two leg portions, and an intermediate portion to which an upper end of said carrier is pivotally connected; wherein one ends of said opposing arms are pivotally connected to said chassis while other ends of said opposing arms are pivotally connected to said two legs of said carrier, and wherein said intermediate arm is pivotally connected to said two leg portions of said strut through auxiliary members.

13. A strut-type suspension for a vehicle comprising: an H-shaped lower arm comprised of a pair of opposing arms and an intermediate arm through which said opposing arms are integrally connected; a strut having an upper end pivotally connected to a chassis of said vehicle and a lower end portion having two leg portions; and a carrier having an upper end pivotally connected to an intermediate portion of said strut and a lower end with two legs which are pivotally connected to one ends of said opposing arms of said lower arm; wherein said intermediate arm of said lower arm is pivotally connected through a bifurcated auxiliary member to said two leg portions of said strut.

14. A strut-type suspension for a vehicle comprising: a strut having a first pivotal connecting portion connected to a chassis of said vehicle, a second pivotal connecting portion connected to an auxiliary member, and an intermediate pivotal connecting portion connected to an upper portion of a carrier, said first, second and intermediate pivotal connecting portions being arranged on a substantially straight line, said carrier being provided with a lower portion with two legs; and a lower arm having a substantially H-shaped structure comprised of a pair of opposing arms and an intermediate arm through which said opposing arms are integrally connected, said opposing arms being pivotally connected at one ends thereof to said chassis and at other ends thereof to said two legs of said carrier, said intermediate arm being pivotally connected to said second pivotal connecting portion of said strut through said auxiliary member.

* * * * *